United States Patent [19]

Guajardo

[11] Patent Number: 4,931,778
[45] Date of Patent: Jun. 5, 1990

[54] CIRCUITRY FOR INDICATING THE PRESENCE OF AN OVERLOAD OR SHORT CIRCUIT IN SOLID STATE RELAY CIRCUITS

[75] Inventor: Ciro Guajardo, Harbor City, Calif.

[73] Assignee: Teledyne Industries, Inc., Los Angeles, Calif.

[21] Appl. No.: 316,189

[22] Filed: Feb. 27, 1989

[51] Int. Cl.⁵ ..................... H01H 71/04; H01H 73/12
[52] U.S. Cl. .................... 340/664; 340/638; 361/93
[58] Field of Search ............. 340/638, 664; 250/551; 307/117; 324/318; 361/93

[56] References Cited

U.S. PATENT DOCUMENTS

| | | | |
|---|---|---|---|
| 3,573,556 | 4/1971 | Zocholl | 340/664 |
| 3,875,464 | 4/1975 | Gary | 340/664 |
| 4,227,098 | 10/1980 | Brown | 250/551 |
| 4,390,790 | 6/1983 | Rodriguez | 250/551 |
| 4,423,431 | 12/1983 | Sasaki | 357/41 |
| 4,424,544 | 1/1984 | Chang | 361/56 |
| 4,429,339 | 1/1984 | Jaeschke | 361/93 |
| 4,528,608 | 7/1985 | Andersson | 361/18 |
| 4,541,002 | 9/1985 | Shimada | 357/51 |
| 4,546,401 | 10/1985 | Svedberg | 361/91 |
| 4,551,779 | 11/1985 | Murakami | 361/86 |
| 4,566,052 | 1/1986 | Kammiller | 361/18 |
| 4,573,099 | 2/1986 | Ganesan | 361/56 |
| 4,581,540 | 4/1986 | Guajardo | 307/117 |
| 4,617,482 | 10/1986 | Matsuda | 307/579 |
| 4,644,250 | 2/1987 | Hartgring | 323/225 |
| 4,661,879 | 4/1987 | Sato | 361/58 |
| 4,686,383 | 8/1987 | Croft | 307/200 |
| 4,691,129 | 9/1987 | Einzinger | 307/581 |
| 4,716,511 | 12/1987 | Masaki | 363/49 |

Primary Examiner—Joseph A. Orsino
Assistant Examiner—Kinfe-Michael Negash
Attorney, Agent, or Firm—Stephen L. King

[57] ABSTRACT

In a solid state relay circuit using a power semiconductor as the output circuit switching device and having protection against current overload and short circuits, an indicator circuit for signaling that overload currents have occurred in the switching device comprising circuitry for sensing that current overload protection has occurred, and switching circuitry responsive to the sensing that current overload protection has occurred for operating a current overload indicator.

9 Claims, 1 Drawing Sheet

ન4,931,778

CIRCUITRY FOR INDICATING THE PRESENCE OF AN OVERLOAD OR SHORT CIRCUIT IN SOLID STATE RELAY CIRCUITS

BACKGROUND OF THE INVENTION

1. Field of the Invention

This invention relates to solid state relay circuits and, more particularly, to solid state relay circuits with overload and short circuit protection circuitry and additional circuitry to indicate the presence of an overload or a short circuit.

2. History of the Prior Art

A great variety of solid state relay circuits have been developed which use a power semiconductor as the output circuit switching device. A major disadvantage of such circuits has been their sensitivity to current overload or short circuit which may destroy the switching device. For this reason, various circuitry has been devised to turn off the switching devices when overload currents or short circuit conditions occur. Examples of such circuits are disclosed in U.S. patent Ser. No. 4,581,540, entitled Circuitry Overload Protected Solid State Relay, Ciro Guajardo, issued Apr. 8, 1986.

Although such circuits provide appropriate protection against current overloads and short circuits in the load circuitry, the fact that such overloads have occurred is not apparent. A circuit for indicating that an overload or short circuit has occurred is very useful because it allows corrections to be made to the circuitry or its environment to eliminate the condition.

It is, therefore, an object of this invention to provide improved solid state relay circuits.

It is another object of this invention to provide circuitry indicating that solid state relay circuits incorporating circuitry for protecting against overload currents and short circuits in the load circuit have, in fact, responded to overloads or short circuits.

SUMMARY OF THE INVENTION

The foregoing and other objects of the invention are accomplished by a solid state relay circuit which utilizes a metal oxide power semiconductor field effect transistor (MOSFET) having drain and source terminals which are connected in series across a load and a power source. A switching circuit is provided which senses current overload and short circuit conditions in the load and, if sufficiently great, shorts the gate terminal of the MOSFET to eliminate the voltage biasing the MOSFET into conduction. The circuit is provided with circuitry to provide an indication when the overload protection circuitry has been actuated so that it may be checked and necessary corrections made without undue delay.

This indicating circuitry includes transistor which operates in response to the current overload to operates a light emitting diode (LED). The LED is optically coupled to a photo-sensitive silicon controlled rectifier which provides a signal to operate the external indication.

Other objects, features, and advantages of the invention will become apparent to those skilled in the art upon reading the following detailed description together with the several figures of the drawings in which like designations have been used for identical elements throughout the several views.

DESCRIPTION OF THE PREFERRED EMBODIMENT

Figure 1:
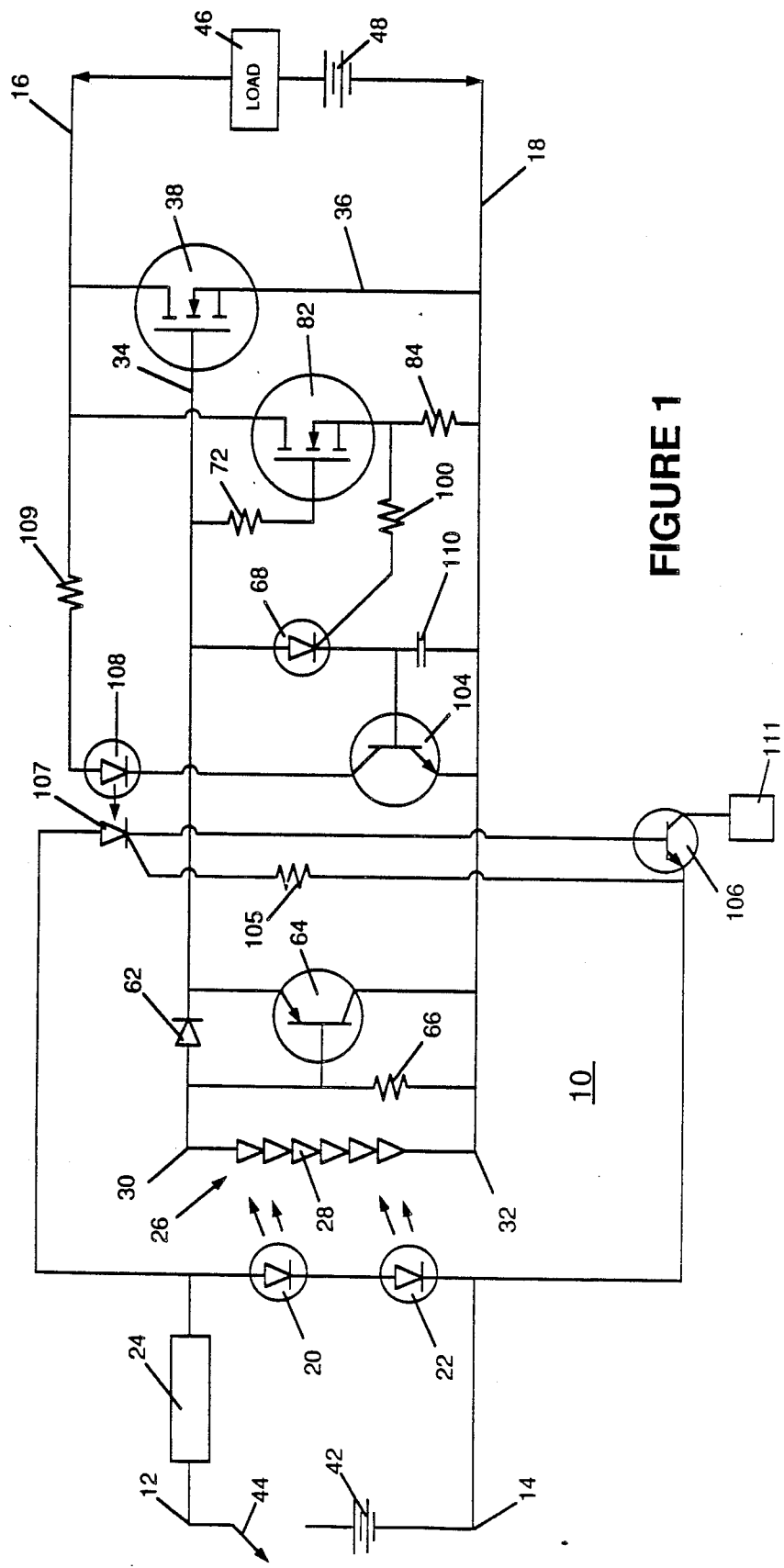
FIG. 1 is a schematic diagram of a circuit which includes the invention in which circuitry provides an output indication that current overload conditions have occurred in the load circuit of a switching MOSFET.

Referring to FIG. 1 there is shown a control circuit 10 constructed in accordance with the invention. The circuit 10 includes a pair of input terminals 12 and 14 and a pair of output terminals 16 and 18.

Connected between the terminals 12 and 14 is a series circuit comprising first and second light emitting diodes (LEDs) 20 and 22 and a current limiting element such as a resistor 24.

In the preferred embodiment of the invention the LEDs 20 and 22 pr<vide infrared light output signals when activated. The LEDs 20 and 22 are positioned adjacent to and optically coupled to a photodiode array 26 having positive and negative output terminals 30 and 32, respectively. The array 26 includes a plurality of photodiodes 28 connected in series to form a photovoltaic voltage source. It is well known to those skilled in the art that a photodiode will produce a voltage and a current (approximately one half a volt at about ten microamperes for a small area silicon diode) in response to light impinging on the surface thereof. The amount of current available from a particular photodiode is proportional to the amount of light impinging on its surface.

By connecting in series a plurality of photodiodes 28, the voltages generated by each are added to produce a desired voltage level at the output terminals 30 and 32 of the array 26. In the preferred embodiment, sixteen photodiodes 28 are connected in series to produce an output voltage of about eight volts at a current level of about ten microamperes in response to light from the LEDs 20 and 22; this voltage is sufficient to operate the output switching device of the circuit. The number of LEDs used to illuminate the array 26 is a matter of design choice. The array 26 is typically fabricated as an integrated circuit device using manufacturing technique such as dielectric isolation which are well known to those skilled in the art.

The positive terminal 30 of the array 26 is connected by a diode 62 to the gate terminal 34 of an N-channel, enhancement mode MOSFET 38. The negative terminal 32 of the array 26 is connected to the source terminal 36 of the MOSFET 38, and the drain and source terminals of the MOSFET 38 are, in turn, connected respectively to the circuit output terminals 16 and 18.

Power MOSFETs are characterized by their ability to switch several amperes of current between their output (drain and source terminals) from a power source of up to several hundred volts. These devices exhibit low output resistance in the on, or conducting, state (typically one-one hundredth of an ohm to ten ohms) and exhibit high output resistance in the off, or non-conducting state (typically one to one hundred megohms). A typical MOSFET device for use in the invention is type number IRF520, supplied by International Rectifier, El Segundo, Calif., or RCA 12.

The MOSFET 38 is biased into full conduction by the application of a first level of voltage (typically six to ten volts) between the gate and source terminals 34 and 36. The first level of voltage is referred to as the turn-on voltage of the MOSFET 38. When the gate to source voltage is below a second level of voltage (typically 1 to 3 volts) the MOSFET 38 is biased into a non-conducting state. This second level of voltage is referred to as the turn-off voltage of the MOSFET 38.

The operation of the circuit 10 as discussed thus far is as follows. An input signal is applied to the input terminals 12 and 14 by, for example, connecting a voltage source 42 across the terminals 12 and 14 using a switch 44 as shown in FIG. 1. In response to the input signal, the LEDs 20 and 22 generate light. This light is optically coupled to the diode array 26 which causes it to produce a voltage across the gate and source terminals 34 and 36 of the MOSFET 38. The MOSFET 38 is biased into full conduction providing a low impedance current path across the output terminals 16 and 18. When the MOSFET 38 is conducting, power is applied to a load 46 from a power source 48. the load 46 and the source 48 are connected in series across the terminals 16 and 18 as shown in FIG. 1. When the switch 44 is opened, the LEDs 20 and 22 no longer generate light. Consequently, the voltage provided by the array 26 drops to zero and the MOSFET 38 turns off.

Connected between the terminal 30 of the array 26 and the gate terminal 34 of the MOSFET 38 is the diode 62 oriented to permit current flow toward the gate terminal 34. A PNP bipolar transistor 64 is provided having its emitter terminal connected to the gate terminal 34, its collector terminal connected to the source terminal 36 of the MOSFET 38, and its base terminal connected to the terminal 30 of the array 26. A resistor 66 is connected across the terminals 30 and 32 of the array 26. The PNP transistor 64 is normally non-conducting during the operation of the MOSFET 38. However, it is biased into conduction between its emitter and collector terminals when the array 26 ceases generating voltage thereby acting to speed up the turn-off time of the MOSFET 38 by providing a discharge path for the inherent capacitance associated with the gate-source elements of the MOSFET 38. The diode 62 couples the bias voltage from the array 26 to the gate 34 of the MOSFET 38. Accordingly, the MOSFET 38 responds to closures of the switch 44 by switching into a conducting state. When the switch 44 is opened, the MOSFET 38 switches to a nonconducting state in an extremely short interval of time due in part to the conduction of the transistor 64.

The circuit 10 of FIG. 1 includes a second MOSFET 82 connected in parallel with the MOSFET 38. The MOSFET 82 has its gate terminal connected to the gate terminal of the MOSFET 38, its source terminal connected by a resistor 84 to the source terminal of the MOSFET 38, and its drain terminal connected to the drain terminal of the MOSFET 38. In the preferred embodiment, the MOSFET 82 has a resistance across its source to drain terminal in the conducting condition of about ten ohms. The resistor 84 is selected in a preferred embodiment to have a value of about forty ohms. In the normal operating condition of the MOSFET 38, the voltage drop across the internal resistance of the MOSFET 38 is insufficient to cause the MOSFET 82 to conduct. However, in a current overload or short circuit condition, the voltage across the MOSFET 38 increases sufficiently that, applied across the MOSFET 82 and the resistor 84, it turns on the MOSFET 82. The time required for the MOSFET 82 to turn on is controlled by the time constant produced by the resistor 72 and the interelectrode capacitance of the MOSFET 82.

A silicon controlled rectifier (SCR) 68 has its anode connected to the gate terminals of the MOSFETS 38 and 82, its gate terminal connected between the source terminal of the MOSFET 82 and the resistor 84 by a resistor 100 and its cathode connected by a capacitor 110 to the source terminal of the MOSFET 38. When the MOSFET 82 responds to an overload current condition through the MOSFET 38 and begins conducting almost the entire voltage across that MOSFET 38 is also across the resistor 84. This is a sufficient voltage (e.g., one-half volt) to cause the SCR 68 to turn on. Turning on the SCR 68 shorts the gate to source terminals of the MOSFET 38 causing it to turn off before it can be damaged by the overload current.

When the MOSFET 38 turns off and current ceases to flow through it, no more voltage is generated across the MOSFET 38 by current therethrough. Consequently, the voltage across the resistor 84 becomes insufficient to maintain the SCR 68 in operation and its cease conducting.

Arrangements providing such short circuit and overload protection against overload current in an output switching MOSFET are disclosed in U.S. Pat. No. 4,581,540, above mentioned.

In order to provide an indication that the overload protection circuitry has functioned so that measures may be taken to correct whatever has caused the overload current, additional circuitry is provided in the circuit 10 of this invention. This circuitry includes an NPN transistor 104.

When the SCR 68 turns on momentarily to disable the MOSFET 38, it furnishes current from the array 26 to the NPN transistor 104. The transistor 104 has its emitter connected to the source terminal of the MOSFET 38, its base connected to the cathode of the SCR 68, and its collector connected by a light emitting diode 108 and a resistor 109 to the drain terminal of the MOSFET 38. When the SCR 68 turns on, the momentary current through the SCR 68 is sufficient to cause the transistor 104 to conduct. This causes the LED 108 to conduct and emit light. In the preferred embodiment of the invention, the LED 108 emits infrared light. The resistor 109, essentially, limits the peak current to the LED 108 which is necessary because the MOSFET 38 has been turned off by the action of the MOSFET 82 and the SCR 68 so that the entire load voltage is across the LED 108 and the resistor 109. A capacitor 110 is provided to preclude very fast transients from operating the transistor 104 and providing false indications.

In order to provide an indication that an overload condition has occurred at the output of the circuit 10, a photosensitive SCR 107 is provided. The SCR 107 is optically coupled to the LED 108. Consequently, it is caused to conduct by the light generated by the operation of the LED 108. The SCR 107 is connected as shown across the LEDs 20 and 22 in series with a resistor 105. The operation of the LED 107 provides current to the base-emitter junction of a transistor 106 to enable it to provide current to light a trip status indicator 111. The indicator 111 may be one of a number of devices known to the prior art such as an LED. The indicator 11 may, in a particular case, be replaced by an input to a computer which automatically indicates the overload current condition has occurred.

In this manner, the circuit of the present invention operates to provide an output signal indicating that the overload current protection circuitry has momentarily operate so that a technician may determine the reason and correct it.

Once the SCR 107 has latched, the photodiodes 26 are shunted and the LED 108 is turned off. This takes approximately fifty microseconds in the preferred embodiment. Since the coupling of the elements 108 and 107 is by light, the output is isolated from the input. This method of turning off the input current is very desirable because no pulses present at the output can reset the SCR 107 and the overload indication will thus persist.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a solid state relay circuit using a power semiconductor as the output circuit switching device and having protection against current overload and short circuits, an indicator circuit for signaling that overload currents have occurred in the switching device comprising means for sensing that current overload protection has occurred, and switching means responsive to the sensing that current overload protection has occurred for operating a current overload indicator.

2. In a solid state relay circuit as claimed in claim 1, the means for sensing that current overload protection has occurred being electrically isolated from the switching means responsive to the sensing that current overload protection has occurred for operating a current overload indicator.

3. In a solid state relay circuit as claimed in claim 1, the means for sensing that current overload protection has occurred comprising a switch, means for enabling the switch in response to the occurrence of current overload protection, and means for generating light in response to the enablement of the switch.

4. In a solid state relay circuit as claimed in claim 3, the switch comprising a transistor, and the means for enabling the switch comprising means connecting the transistor to receive enabling current in response to the occurrence of current overload protection.

5. In a solid state relay circuit as claimed in claim 3, means for generating light in response to the enablement of the switch comprising a light emitting diode connected to operate in response to the enabling of the switch.

6. In a solid state relay circuit as claimed in claim 1, switching means responsive to the sensing that current overload protection has occurred for operating a current overload indicator comprising a transistor having its input connected to receive signals from the means for sensing that current overload protection has occurred.

7. In a solid state relay circuit as claimed in claim 6, means for coupling signals from the means for sensing that current overload protection has occurred to the transistor.

8. In a solid state relay circuit as claimed in claim 7, the means for coupling singals providing electrical isolation between the means for sensing that current overload protection has occurred and the transistor.

9. In a solid state relay circuit as claimed in claim 7, the means for coupling signals between the means for sensing that current overload protection has occurred and the transistor comprising a light emitting diode operating in response to the means for sensing that current overload protection has occurred, and a photosensitive silicon controlled rectifier connected to the input of the transistor.

* * * * *

UNITED STATES PATENT AND TRADEMARK OFFICE
CERTIFICATE OF CORRECTION

PATENT NO. : 4,931,778
DATED : 06/05/90
INVENTOR(S) : Guarjardo

It is certified that error in the above-identified patent and that said Letters Patent is hereby corrected as shown below:

| | |
|---|---|
| col.02, line 19 | delete "pr<vide" insert --provide-- |
| col. 04, line 20 | delete "cease" insert --ceases-- |
| col. 04, line 62 | delete "11" insert --111-- |
| col. 05, line 01 | delete "operate" insert --operated-- |
| col. 06, line 25 | delete "singals" insert --signals-- |

Signed and Sealed this

Seventeenth Day of September, 1991

*Attest:*

HARRY F. MANBECK, JR.

*Attesting Officer*    *Commissioner of Patents and Trademarks*